(12) United States Patent
Yasuda et al.

(10) Patent No.: US 7,670,068 B2
(45) Date of Patent: Mar. 2, 2010

(54) ACTUATOR, SHUTTER DRIVING DEVICE FOR CAMERA AND METHOD OF MANUFACTURING ACTUATOR

(75) Inventors: Akira Yasuda, Chiba (JP); Akihiro Ito, Chiba (JP); Masato Tanaka, Chiba (JP)

(73) Assignee: Seiko Precision Inc., Chiba (JP)

( * ) Notice: Subject to any disclaimer, the term of this patent is extended or adjusted under 35 U.S.C. 154(b) by 40 days.

(21) Appl. No.: 12/078,160

(22) Filed: Mar. 27, 2008

(65) Prior Publication Data

US 2008/0240707 A1 Oct. 2, 2008

(30) Foreign Application Priority Data

Mar. 29, 2007 (JP) .............................. 2007-086447

(51) Int. Cl.
*G03B 9/08* (2006.01)
(52) U.S. Cl. ..................... 396/463; 396/452; 396/506
(58) Field of Classification Search ............... 396/352, 396/353, 452–456, 463, 467–469, 508
See application file for complete search history.

(56) References Cited

U.S. PATENT DOCUMENTS

| 5,561,486 | A * | 10/1996 | SanGregory | 396/463 |
| 6,733,192 | B2 * | 5/2004 | Watanabe | 396/463 |
| 6,880,988 | B2 * | 4/2005 | Kurosu et al. | 396/463 |
| 2003/0062092 | A1 | 4/2003 | Nagai et al. | 137/884 |
| 2006/0006968 | A1 * | 1/2006 | Mizumaki | 335/272 |
| 2006/0220490 | A1 | 10/2006 | Watanabe | 310/261 |

FOREIGN PATENT DOCUMENTS

| CN | 2582265 Y | 10/2003 |
| CN | 1841891 A | 10/2006 |
| JP | 2003-113807 | 4/2003 |
| JP | 2004-191750 | 7/2004 |
| JP | 2005-121801 | 5/2005 |

OTHER PUBLICATIONS

Office Action issued on Jan. 20, 2009 in corresponding Japanese patent application No. 2007-086447—Notification of Reason(s) for Refusal with English translation.
Chinese Office Action dated Jun. 5, 2009 with its English translation.

* cited by examiner

*Primary Examiner*—W. B. Perkey
*Assistant Examiner*—Warren K Fenwick
(74) *Attorney, Agent, or Firm*—Kratz, Quintos & Hanson, LLP

(57) ABSTRACT

An actuator includes: a coil for excitation; a stator excited with different magnetic poles by energization of the coil; a rotor magnetized with different magnetic poles in a circumferential direction, and rotated by magnetic force generating between the rotor and the stator; and an outputting member rotated in conjunction with the rotor and outputting rotational movement of the rotor to a member. The outputting member fits onto the rotor, and the rotor has at least one of a recess portion and a projection portion at a fitting surface of the rotor. The outputting member is jointed with the rotor so as to have a shape corresponding to the at least one of the recess portion and the projection portion by welding.

19 Claims, 8 Drawing Sheets

ACTUATOR, SHUTTER DRIVING DEVICE FOR CAMERA AND METHOD OF MANUFACTURING ACTUATOR

BACKGROUND OF THE INVENTION

1. Field of the Invention

The present invention relates to an actuator, a shutter driving device for a camera, and a method of manufacturing an actuator.

2. Description of the Related Art

Conventionally, there has been known an actuator used for driving a shutter blade employed in a camera, and composed of a rotor, a stator, a coil for exerting the stator, and an outputting member for transmitting the rotational movement of the rotor to the shutter blade. Japanese Patent Application Publication No 2004-191750 discloses that the rotor and the outputting member are insert-molded.

However, in the case where the rotor and the outputting member are insert-molded, it is difficult to maintain the accuracy of the angular position of the outputting member against the rotor.

Consequently, when the rotor and the outputting member are jointed by welding, the angular position of the outputting member against the rotor can be finely adjusted before welding. This improves the accuracy of the angular position of the outputting member against the rotor.

However, even if the welding joint is performed, a long-time use may weaken the joint of the rotor and the outputting member, which may cause a displacement between the rotor and the outputting member. Specifically, as the load applied to the rotor and the outputting member increases in accordance with the faster shutter speed, the possibility of the above problem may increase.

SUMMARY OF THE INVENTION

It is therefore an object of the present invention to provide an actuator, a shutter driving device for a camera, and a method of manufacturing an actuator such that the jointing of a rotor and an outputting member is strengthen.

According to an aspect of the present invention, there is provided an actuator including: a coil for excitation; a stator excited with different magnetic poles by energization of the coil; a rotor magnetized with different magnetic poles in a circumferential direction, and rotated by magnetic force generating between the rotor and the stator; and an outputting member rotated in conjunction with the rotor and outputting rotational movement of the rotor to a member, the outputting member fitting onto the rotor, the rotor having at least one of a recess portion and a projection portion at a fitting surface of the rotor, and the outputting member being jointed with the rotor so as to be shaped to the at least one of the recess portion and the projection portion by welding. These arrangements prevent the displacement of the outputting member against the rotor after welding, and strengthen the joint of the rotor and the outputting member.

According to another aspect of the present invention, there is provided a shutter driving device for a camera including: a plate having an aperture; a shutter blade for opening and closing the aperture, and an actuator for driving the shutter blade, wherein the actuator including: a coil for excitation; a stator excited with different magnetic poles by energization of the coil; a rotor magnetized with different magnetic poles in a circumferential direction, and rotated by magnetic force generating between the rotor and the stator; and an outputting member rotated in conjunction with the rotor and outputting rotational movement of the rotor to a member, the outputting member fitting onto the rotor, the rotor having at least one of a recess portion and a projection portion at a fitting surface of the rotor, and the outputting member being jointed with the rotor so as to be shaped to the at least one of the recess portion and the projection portion by welding. The shutter driving device for camera employs the actuator in which the displacement of the rotor and the outputting member is prevented, thereby dealing with the increased shutter speed, and preventing the failure by the long term use.

According to yet another aspect of the present invention, there is provided a method of manufacturing an actuator having: a rotor magnetized with different magnetic poles in a circumferential direction; and an outputting member jointed with the rotor, rotated in conjunction with the rotor, and outputting a rotational movement of the rotor to a member, the method of manufacturing the actuator including: forming at least one of a recess portion and a projection portion on a fitting surface of the rotor for fitting into the outputting member; fitting the outputting member onto the rotor, and welding the outputting member with the rotor so that the outputting member is deformed to be shaped to the at least one of a recess portion and a projection portion. These configurations strengthen the jointing of the rotor and the outputting member.

BRIEF DESCRIPTION OF THE DRAWINGS

Exemplary embodiments of the present invention will be described in detail with reference to the following drawings, wherein.

DETAILED DESCRIPTION OF THE PREFERRED EMBODIMENTS

A description will now be given of embodiments of the present invention with reference to the accompanying drawings.

First Embodiment

Figure 1:
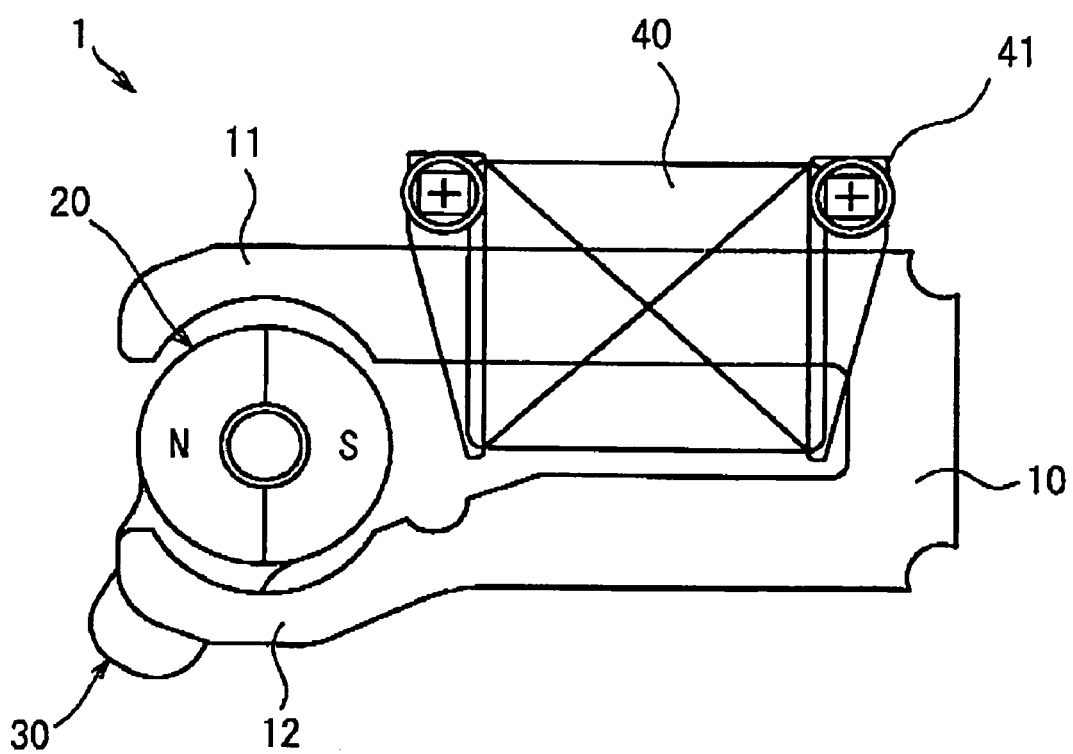
FIG. 1 is a view showing parts of an electromagnetic actuator in accordance with an embodiment.

FIG. 1 is a view illustrative of an essential part of an electromagnetic actuator in accordance with a first embodiment.

An electromagnetic actuator 1 includes a stator 10, a rotor 20, an outputting member 30, and a coil 40. The stator 10 has a U shape, and has a first magnetic pole portion 11 and a second magnetic pole portion 12 at respective ends thereof. The rotor 20 has a cylindrical shape, and two different poles magnetized in the circumferential direction. The coil 40 is wound around a coil bobbin 41. The coil 40 is energized to excite the first magnetic pole portion 11 and the second magnetic pole portion 12 so as to have opposite polarities. The outputting member 30 outputting rotational movement of the rotor 20 is attached to an object side of the rotor 20 (refer to FIG. 4). Therefore, the outputting member 30 swings in conjunction with the rotor 20 within a predetermined rotational range.

The rotor 20 is made of a sintered magnet. Specifically, the rotor 20 is an aeolotropic ferrite magnet. The rotor 20 may be a rare earth sintered magnet or an isotropic ferrite magnet.

The outputting member 30 is made of polyacetal resin through which the laser beam passes. Besides, the outputting member 30 may be made of polyester polybutylene terephthalate resin, liquid crystalline polyester resin, polyphenylene sulfide resin, polyphenylene sulfide resin, or the like. The outputting member 30 is desired to have a color that allows the laser beam to pass therethrough.

Figure 2:
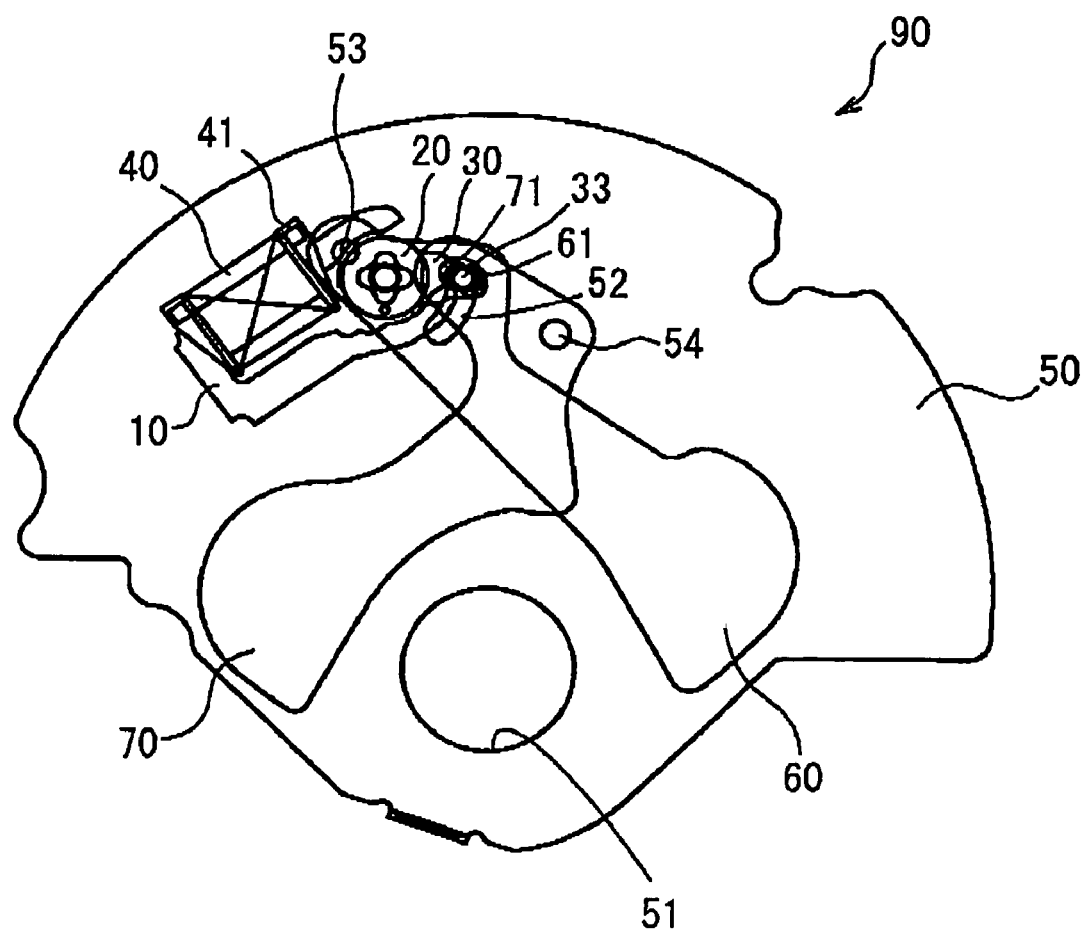
FIG. 2 is a perspective view of a shutter driving device in a fully opened state.
Figure 3:
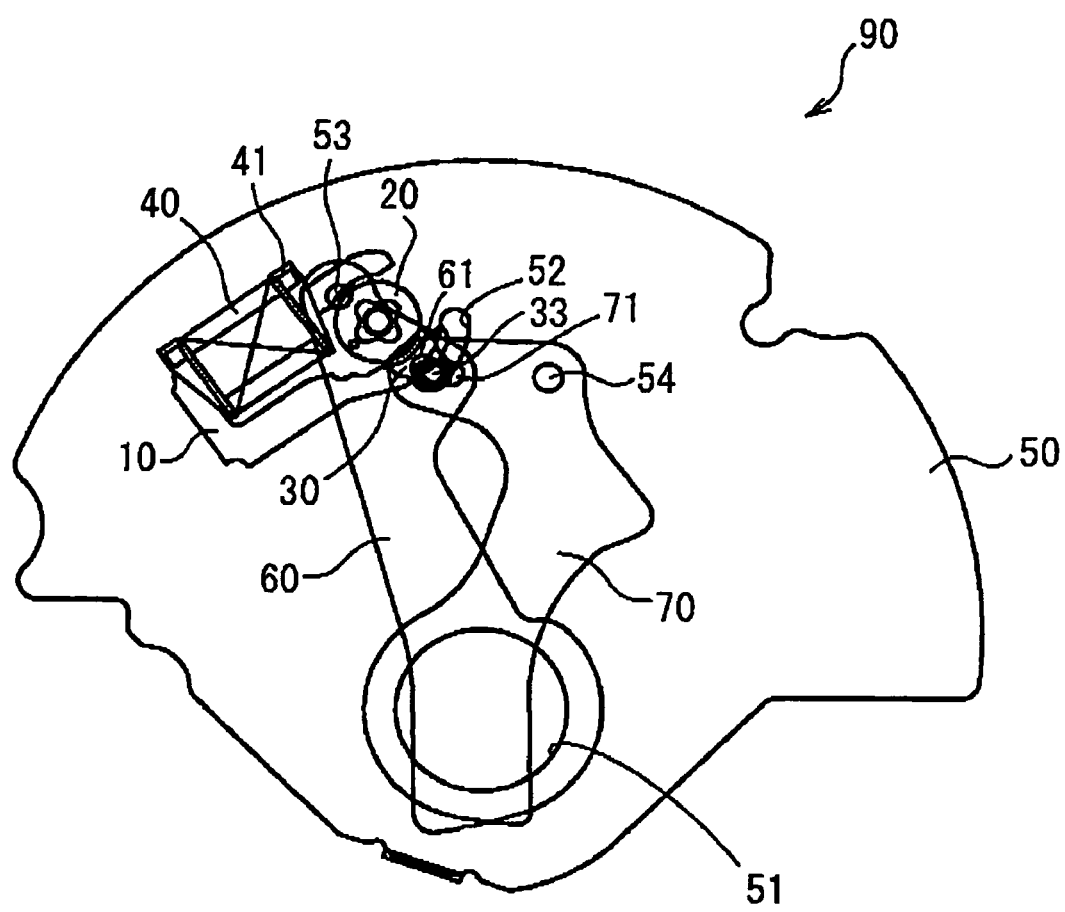
FIG. 3 is a perspective view of the shutter driving device in a fully closed state.

FIGS. 2 and 3 are perspective views of a shutter driving device 90 employing this electromagnetic actuator as a driving source. More specifically, FIG. 2 shows the shutter driving device 90 in a fully opened state, and FIG. 3 shows the shutter driving device 90 in a fully closed state.

The shutter driving device 90 employing the electromagnetic actuator 1 includes a base plate 50, a first shutter blade 60, and a second shutter blade 70. The base plate 50 has an aperture 51 for shooting. The first shutter blade 60 and the second shutter blade 70 are disposed at a front side in FIGS. 2 and 3. The actuation of the first shutter blade 60 and the second shutter blade 70 changes the aperture 51 into the fully closed state or the fully opened state. The electromagnetic actuator 1 is disposed at the back side of the front side at which the first shutter blade 60 and the second shutter blade 70 are disposed. For this reason, the electromagnetic actuator 1 as shown in FIGS. 2 and 3 and that as shown in FIG. 1 are symmetrical.

The base plate 50 has a receiving slot 52 for receiving the rotation of the outputting member 30. The receiving slot 52 has an arc shape. The outputting member 30 passes through the receiving slot 52 so as to rotate within a predetermined range. That is to say, the receiving slot 52 has a function for controlling the rotational range of the rotor 20.

The first shutter blade 60 and the second shutter blade 70 have a cam slot 61 and a cam slot 71, respectively. The outputting member 30 engages with the cam slots 61 and 71, so that the first shutter blade 60 and the second shutter blade 70 are swung about a spindle 53 and a spindle 54, respectively, formed in the base plate 50. Therefore, the rotational movement of the rotor 20 transmits to the first shutter blade 60 and the second shutter blade 70 via the outputting member 30, and the first shutter blade 60 and the second shutter blade 70 perform the shutter operation.

Figure 4:
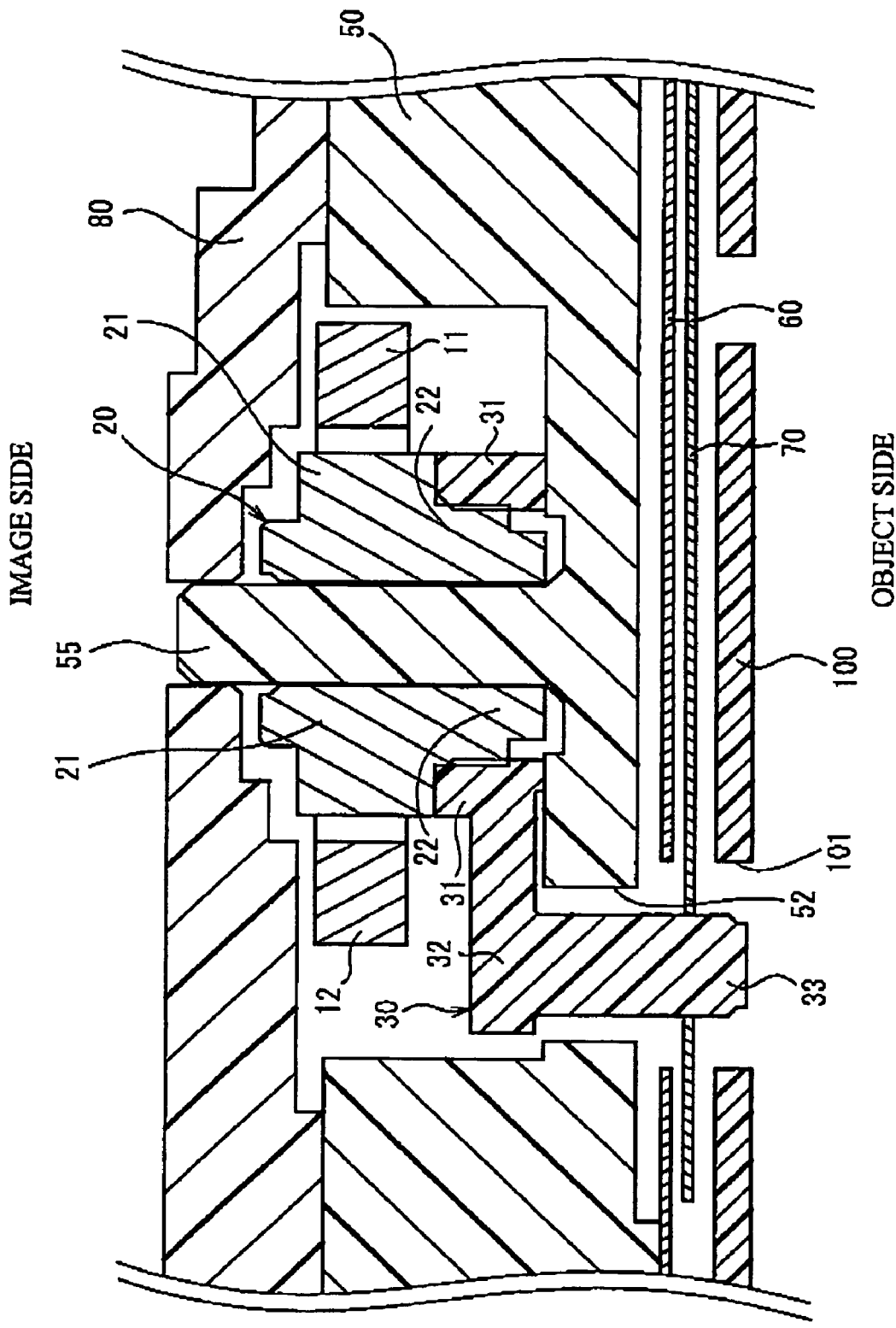
FIG. 4 is a cross-sectional view showing the configuration of the shutter driving device.

FIG. 4 is a cross-sectional view showing the configuration of the shutter driving device 90. A supporting plate 80 is disposed at an image side of the base plate 50, for supporting the electromagnetic actuator 1 between the supporting plate 80 and the base plate 50. A shutter supporting plate 100 is disposed at the object side of the base plate 50, for supporting the first shutter blade 60 and the second shutter blade 70 between the shutter supporting plate 100 and the base plate 50. A spindle 55 is formed in the base plate 50 and extends toward the image side along the optical axis. The rotor 20 is rotatably supported by the spindle 55.

The rotor 20 has a large diameter portion 21 and a small diameter portion 22 different from the large diameter portion 21 in the diameter. The large diameter portion 21 is located closer to the image side, whereas the small diameter portion 22 is located further from the image side. The large diameter portion 21 faces the first magnetic pole portion 11 and the second magnetic pole portion 12. Thus, the rotor 20 is mainly rotated by the magnetic force generated between the large diameter portion 21, and the first magnetic pole portion 11 and the second magnetic pole portion 12.

A cylindrical portion 31 of the outputting member 30 is press-fitted onto the small diameter portion 22, whereby the outputting member 30 surrounds the rotor 20. A fitting hole 34 is formed in the cylindrical portion 31, and has a slightly smaller diameter than that of the small diameter portion 22. In a state in which the cylindrical portion 31 is press-fitted on the small diameter portion 22, the outputting member 30 and the small diameter portion 22 are substantially identical in the external diameter. The small diameter portion 22 has a fitting surface fitted with the outputting member 30.

The outputting member 30 includes an arm 32 and a pin 33. The arm 32 extends radially outward from the cylindrical portion 31. The pin 33 extends from a distal end of the arm 32 toward the object side along the optical axis. The pin 33 engages with the cam slots 61 and 71. Additionally, a receiving slot 101 is formed in the shutter supporting plate 100, for receiving the swinging of the pin 33.

Figure 5A:
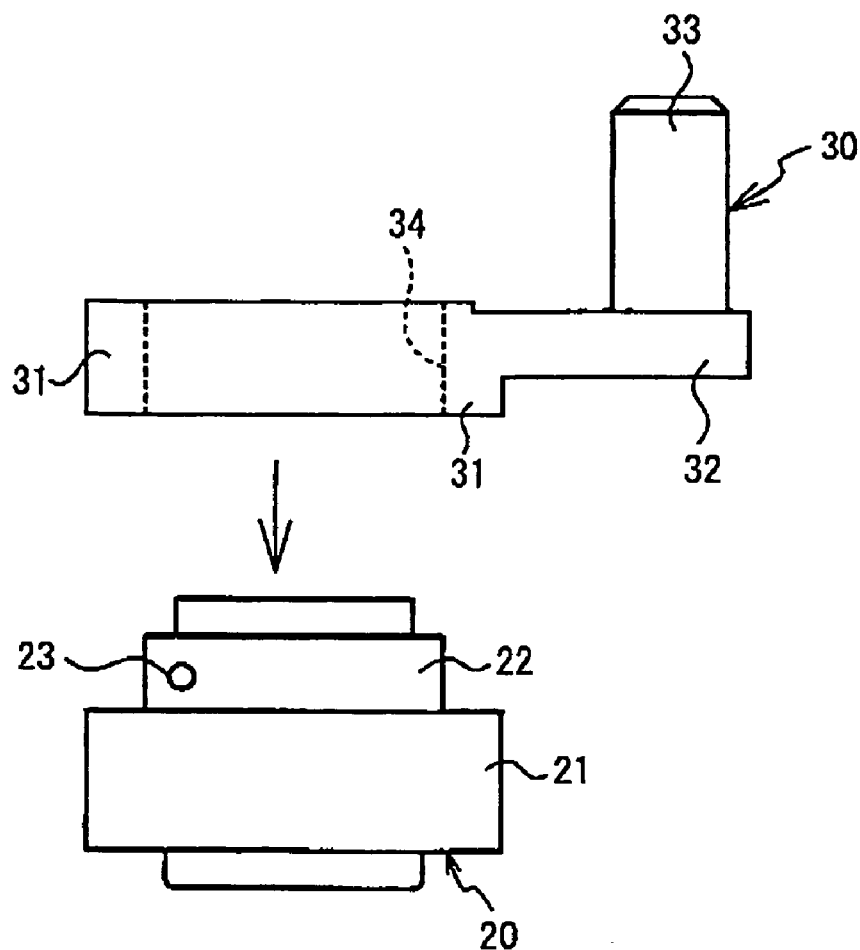
FIGS. 5A through 5B show a jointing method.
Figure 5B:
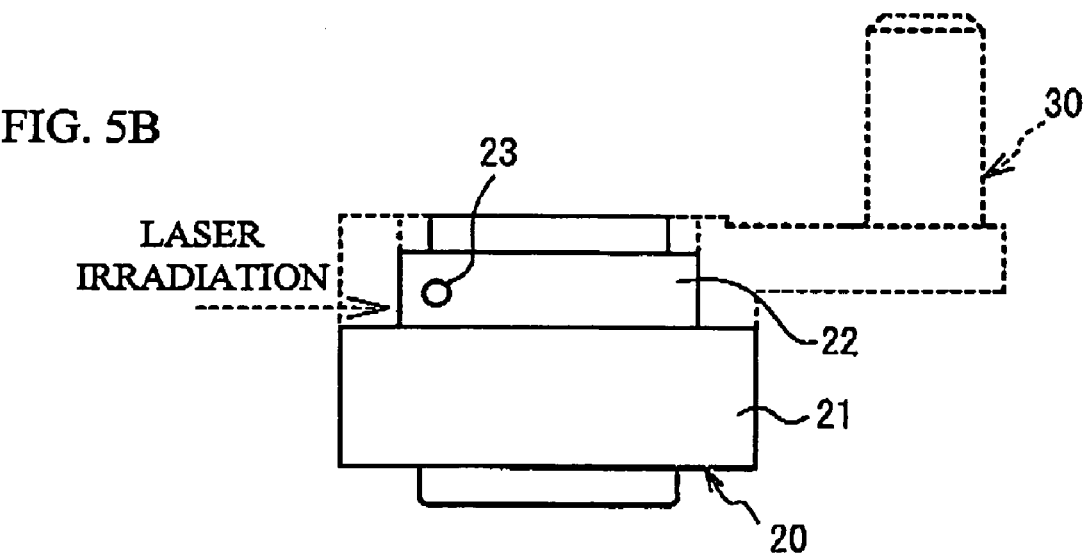

A method of jointing the rotor 20 and the outputting member 30 will be described below. FIGS. 5A through 5B illustrate the jointing method. As shown in FIGS. 5A through 5B, a blind hole 23 having a bottom is formed in the small diameter portion 22. First, referring now to FIG. 5A, the small diameter portion 22 is press-fitted onto the fitting hole 34 of the outputting member 30.

Next, as shown in FIG. 5B, the laser is irradiated from the outside of the rotor 20 and the outputting member 30 to the proximity of the blind hole 23 of the small diameter portion 22. The irradiated laser transmits through the outputting member 30 and reaches the proximity of the blind hole 23, then melting an area, closer to the blind hole 23, of the fitting hole 34 by the heat of the laser, and causing the resin melted from the fitting hole 34 to pour into the blind hole 23. After a predetermined period, the resin melted from the fitting hole 34 becomes hard so as to correspond to the shape of the blind hole 23. This prevents the displacement of the outputting member 30 against the rotor 20, and strengthens the jointing of the rotor 20 and the outputting member 30.

Additionally, the rotor 20 is not melted by the laser irradiation, since the rotor 20 is sintered magnet, as described before. Furthermore, since the rotor 20 is sintered magnet, even if the rotor 20 is downsized, torque can be maintained, as compared to a case where the rotor is made of magnetic resin. Therefore, the electromagnetic actuator 1 can be downsized. Furthermore, the increased shutter speed can be handled.

Figure 6:
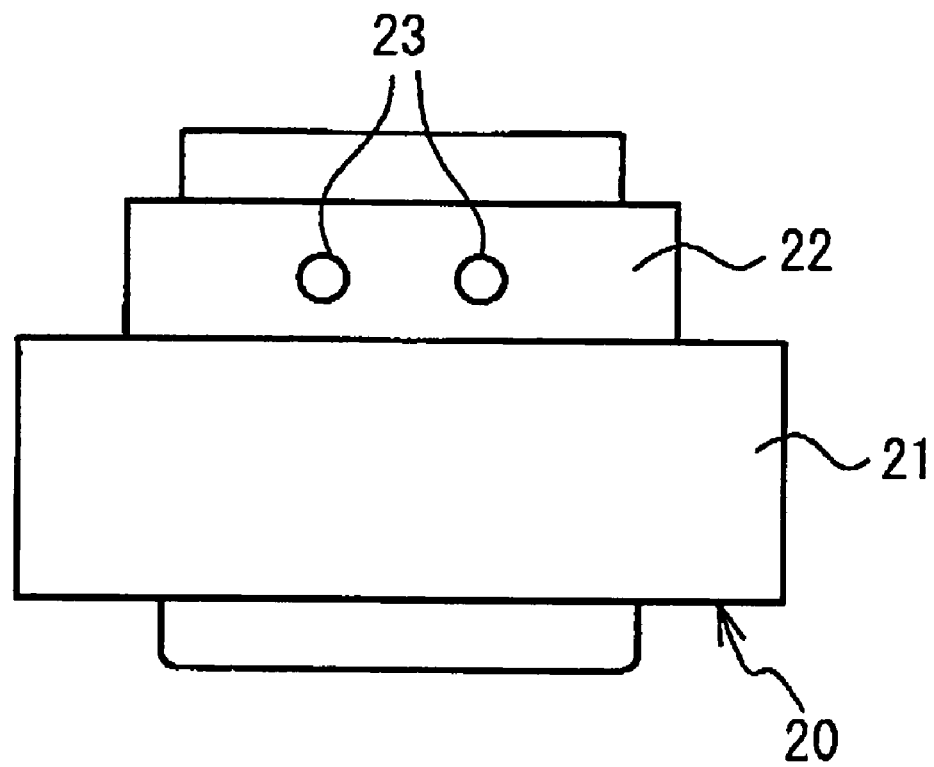
FIG. 6 shows a blind hole.

The blind hole 23 will be described below in detail. FIG. 6 illustrates the blind hole 23. As shown in FIG. 6, two blind holes 23 are formed in the small diameter portion 22. When the laser is irradiated, the laser is directed between the blind holes 23. The laser is irradiated in the state in which the outputting member 30 is press-fitted onto the small diameter portion 22, thus melting the area, between the blind holes 23, of the outputting member 30. Thus, the melting resin is poured into the blind holes 23. Consequently, the provision of the blind holes 23 prevents the displacement of the rotor 20 against the outputting member 30 in the axis and circumferential direction.

Figure 7A:
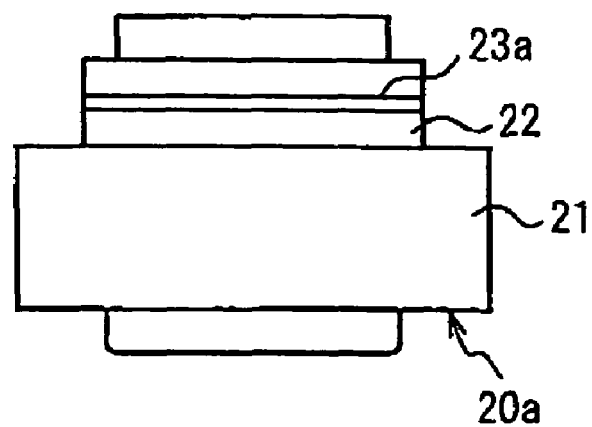
FIGS. 7A through 7C show a rotor in accordance with a variation of the embodiment.
Figure 7B:
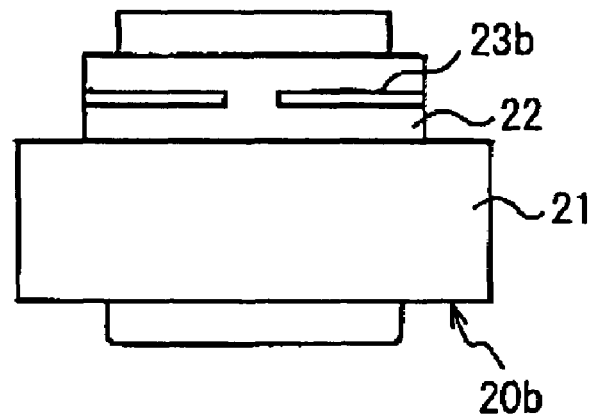
Figure 7C:
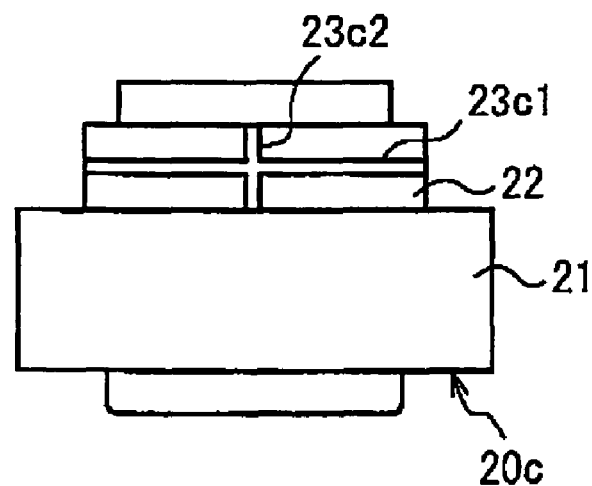

A variation of the rotor will be described below. FIGS. 7A to 7C illustrate a rotor in accordance with the variation. FIG. 7A shows a rotor 20a provided with a lateral groove 23a at the small diameter portion 22. The lateral groove 23a extends in the circumferential direction. This arrangement prevents the displacement of the rotor 20a against the outputting member 30 in the axis direction, after the welding. Further, since the lateral groove 23a extends in the circumferential direction, it is only necessary that the laser be irradiated in the proximity of the lateral groove 23a. This can roughly set the position of the laser irradiation. Consequently, the workability is enhanced.

FIG. 7B shows a rotor 20b provided with a lateral groove 23b. The lateral groove 23b differs from the lateral groove 23a shown in FIG. 7A in that the lateral groove 23b is discontinuous on the way. This arrangement prevents the displacement of the rotor 20b against the outputting member 30 in the circumferential direction.

FIG. 7C shows a rotor 20c provided with a lateral groove 23c1 and a longitudinal groove 23c2. The lateral groove 23c1 extends in the circumferential direction. The longitudinal groove 23c2 extends in the axis direction. The lateral groove 23c1 and the longitudinal groove 23c2 are formed in a cross shape, thereby preventing the displacement of the rotor 20c against the outputting member 30 in the axis and circumferential direction. Additionally, it is to be noted that the laser should be irradiated to the vicinity of the longitudinal groove 23c2.

Second Embodiment

Figure 8:
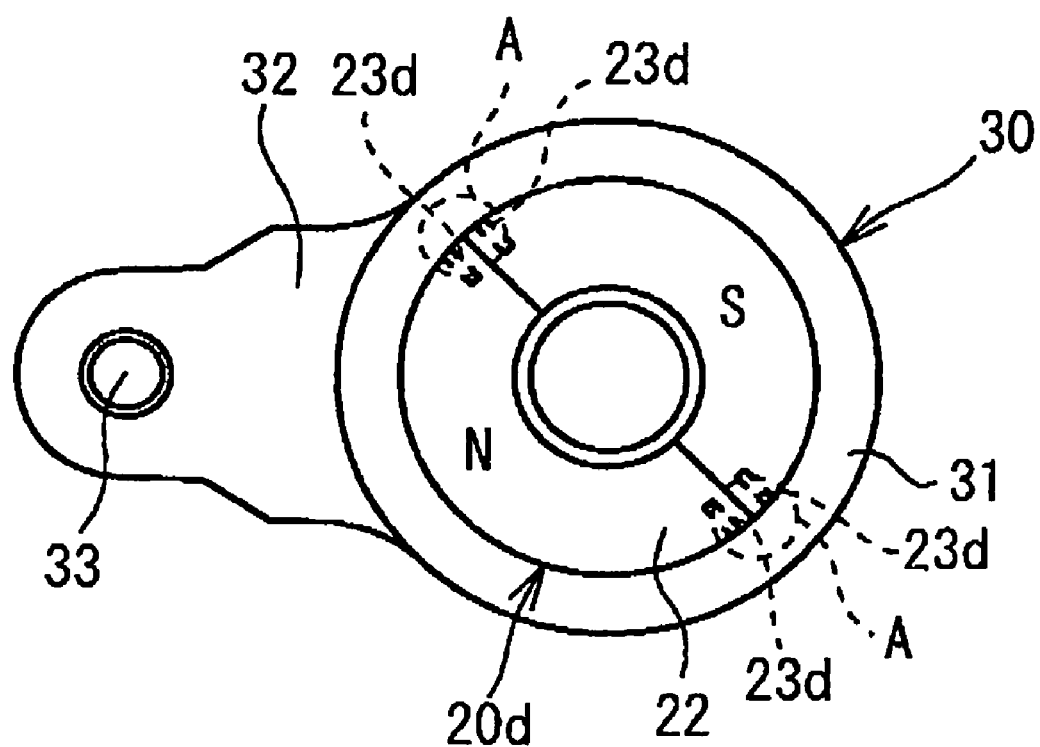
FIG. 8 is a front view of a rotor and an outputting member employed in the electromagnetic actuator in accordance with a second embodiment.

An electromagnetic actuator in accordance with a second embodiment will be described below. The same portions as those in the first embodiment are given the same reference numerals, and a description thereof will be omitted. FIG. 8 is a front view of a rotor and an outputting member employed in the electromagnetic actuator in accordance with the second embodiment.

A rotor 20d is made of magnetic resin, that is, plastic magnet. Specifically, the rotor 20d is formed of a mixture of magnetic powder of SmFeN and polyamide resin. Additionally, any material other than that mentioned above may be used for the rotor 20d. For example, NdFeB may be employed as magnetic powders, and thermoplastic polyphenylene sulfide resin or polyester polybutylene terephthalate resin may be employed as binder resin.

The rotor 20d is magnetized with the north pole and the south pole. Blind holes 23d are formed to interpose the boundary of the magnetic poles. Like the rotor 20 described in the first embodiment, the blind holes 23d are formed in the small diameter portion 22. Additionally, the blind holes 23d are also formed in the rotor 20d when the whole rotor 20d is produced. At the time of laser welding, the laser is irradiated to welding points A in the vicinity of boundaries of the magnetic poles from outside of the rotor 20d and the outputting member 30.

In the case where the rotor 20d is made of an isotropic magnet, the position of the boundary of the magnetic poles of the rotor 20d is determined when the rotor 20d is magnetized. In the case where the rotor 20d is made of an anisotropic magnet, the position of the boundary of the magnetic poles of the rotor 20d is determined when the rotor 20d is anisotropically magnetized. The rotor 20d is formed so that the boundary of the magnetic poles is located to be sandwiched between the blind holes 23d. The boundary of the magnetic poles may be marked when the magnetic poles are magnetized. Additionally, the positions of the boundaries of the magnetic poles may be detected by using a device for detecting the magnetic flux density, and the detected positions may be marked. The positions of the boundaries of the magnetic poles may be estimated on the basis of the contour of the outputting member 30 press-fitted onto the rotor 20d at a desired angle against the rotor 20d.

At the time of laser welding, a laser-irradiated portion of the rotor 20d and a portion, close to the laser-irradiated portion, of the outputting member 30 are melted by the heat of the laser, thus welding the rotor 20d with the outputting member 30. The thermal shock caused by the heat of the laser, or the shape deformation caused by melting the rotor 20d may degrade the magnetic characteristic of the rotor 20d. However, as mentioned above, the laser is irradiated to the boundary of the rotor 20d, so that the magnetic pole of the rotor 20d is not entirely melted, thus, restraining the deterioration of the magnetic characteristic of the rotor 20d.

The rotor 20, which is magnetized with two magnetic poles in the circumferential direction, describes in the above embodiment. However, the rotor 20 may be magnetized with four magnetic poles in the circumferential direction.

In the above embodiments, there has been described that there is one welding portion in case of the rotor 20 made of a sintered magnet, and there are two welding portions in case of the rotor 20d made of plastic magnet. However, any number of the welding portions may be employed, and at least one is necessary.

In the above embodiments, there has been described that the blind holes 23d are formed in the rotor 20d so as to interpose the boundary of the magnetic poles. However, at least one of the blind holes 23d may be formed near the boundary of the magnetic poles. Additionally, a predetermined number of the blind holes 23d may be set to interpose the boundary of the magnetic poles.

As described above, the rotor 20 is formed with the blind hole 23, the lateral grooves 23a, 23b, and 23c1, or the longitudinal groove 23c2. However, these shapes are not restrictive, but the rotor 20 has only to be a recessed shape, into which the outputting member 30 can be partially melted and can be poured, and thus preventing the displacement of the rotor 20 and the outputting member 30.

In the above embodiments, the holes 23 and 23d, and the grooves 23a, 23b, 23c1 and 23c2 have been described as examples of a recess portion. However, a projection portion may be employed instead of the recess portion. Additionally, the projection portion may be any projection portion around which the outputting member 30 can be partially melted and can be poured, and thus allowing the outputting member 30 to have a shape corresponding to the projection portion.

There has been described that the first shutter blade 60 and the second shutter blade 70 are driven in the above embodiment, however, single blade having a diaphragm aperture smaller than the aperture 51, or at least of the blades having a neutral density filter may be driven.

While the exemplary embodiments of the present invention have been illustrated in detail, the present invention is not limited to the above-mentioned embodiments, and other embodiments, variations and modifications may be made without departing from the scope of the present invention.

The present application is based on Japanese Patent Application No. 2007-086447 filed Mar. 29, 2007, the entire disclosure of which is hereby incorporated by reference.

What is claimed is:

1. An actuator comprising:
   a coil for excitation;
   a stator excited with different magnetic poles by energization of the coil;
   a rotor magnetized with different magnetic poles in a circumferential direction, and rotated by magnetic force generating between the rotor and the stator; and
   an outputting member rotated in conjunction with the rotor and outputting rotational movement of the rotor to a member, the outputting member fitting onto a fitting surface of the rotor, the rotor having at least one of a recess portion and a projection portion on the fitting surface of the rotor, and the outputting member being jointed with the rotor so as to have a shape corresponding to the at least one of the recess portion and the projection portion by welding.

2. The actuator according to claim 1, wherein the rotor is made of a sintered magnet.

3. The actuator according to claim 1, wherein a welding position of the rotor is a boundary of magnetic poles of the rotor.

4. The actuator of claim 1, wherein said at least one of a recess portion and a projection portion is at least one of a hole, a lateral groove, and a longitudinal groove.

5. The actuator of claim 1, wherein the outputting member surrounds the rotor.

6. The actuator of claim 1, wherein the outputting member is transparent to welding laser light.

7. The actuator of claim 1, wherein the welding that jointed the outputting member with the rotor further comprises melting the outputting member such that the outputting member pours into the shape corresponding to the at least one of the recess portion and the projection portion.

8. The actuator of claim 7, wherein the outputting member comprises resin transparent to welding laser light, wherein the rotor is not made of magnetic resin, and wherein the welding that jointed the outputting member with the rotor further comprises welding by melting the resin by heat of the laser light on the rotor.

9. The actuator of claim 1, wherein the outputting member was press-fitted onto the fitting surface of the rotor and the at least one of the recess portion and the projection portion comprises just a recess portion.

10. A shutter driving device for a camera comprising:
a plate having an aperture;
a shutter blade for opening and closing the aperture; and
an actuator for driving the shutter blade,
wherein the actuator including:
a coil for excitation;
a stator excited with different magnetic poles by energization of the coil;
a rotor magnetized with different magnetic poles in a circumferential direction, and rotated by magnetic force generating between the rotor and the stator; and
an outputting member rotated in conjunction with the rotor and outputting rotational movement of the rotor to a member,
the outputting member fitting onto a fitting surface of the rotor, the rotor having at least one of a recess portion and a projection portion on the fitting surface of the rotor, and
the outputting member being jointed with the rotor so as to have a shape corresponding to the at least one of the recess portion and the projection portion by welding.

11. The shutter driving device for a camera of claim 10, wherein said at least one of a recess portion and a projection portion is at least one of a hole, a lateral groove, and a longitudinal groove.

12. The shutter driving device for a camera of claim 10, wherein the outputting member surrounds the rotor.

13. The shutter driving device for a camera of claim 10, wherein the outputting member is transparent to welding laser light.

14. The shutter driving device for a camera of claim 10, wherein the welding that jointed the outputting member with the rotor further comprises melting the outputting member such that the outputting member pours into the shape corresponding to the at least one of the recess portion and the projection portion.

15. The shutter driving device for a camera of claim 14, wherein the welding that jointed the outputting member with the rotor further comprises melting the outputting member such that the outputting member pours into the shape corresponding to the at least one of the recess portion and the projection portion.

16. The shutter driving device for a camera of claim 10, wherein the outputting member was press-fitted onto the fitting surface of the rotor and the at least one of the recess portion and the projection portion comprises just a recess portion.

17. A method of manufacturing an actuator having: a rotor magnetized with different magnetic poles in a circumferential direction; and an outputting member jointed with the rotor, rotated in conjunction with the rotor, and outputting a rotational movement of the rotor to a member, the method comprising:
forming at least one of a recess portion and a projection portion on a fitting surface of the rotor for fitting into the outputting member;
fitting the outputting member onto the rotor, and
welding the outputting member to the rotor so that the outputting member is deformed so as to have a shape corresponding to the at least one of a recess portion and a projection portion.

18. The method of claim 17, wherein the step of fitting includes fitting a cylindrical portion of the outputting member onto the rotor.

19. The method of claim 17, wherein the step of welding comprises melting the outputting member such that the outputting member pours into the shape corresponding to the at least one of the recess portion and the projection portion.

* * * * *